United States Patent [19]
Brewster et al.

[11] 3,792,908
[45] Feb. 19, 1974

[54] FLUID PRESSURE CONTROL VALVE

[75] Inventors: Alan Ronald Brewster; Samuel Eric Harvey; Frank Radcliffe Mortimer, all of Coventry, England

[73] Assignee: Dunlop Holdings Limited, London, England

[22] Filed: Sept. 22, 1971

[21] Appl. No.: 182,787

[30] Foreign Application Priority Data
Sept. 26, 1970 Great Britain.................... 45943/70

[52] U.S. Cl............. 303/21 F, 188/181 A, 137/102
[51] Int. Cl................................................ B60t 8/02
[58] Field of Search.... 303/21 F, 21 R, 21 CG, 6 R, 303/10; 188/181 R, 181 A; 137/102, 115

[56] References Cited
UNITED STATES PATENTS
| | | | |
|---|---|---|---|
| 3,682,514 | 8/1972 | Oberthur........................... | 303/21 F |
| 3,261,645 | 7/1966 | Alfieri et al........................ | 137/102 |
| 3,695,734 | 10/1972 | Hennig et al...................... | 303/21 F |
| 3,679,270 | 7/1972 | Jania................................. | 303/10 X |
| 3,610,702 | 10/1971 | MacDuff........................... | 303/6 R X |

Primary Examiner—Duane A. Reger
Assistant Examiner—Edward R. Kazenske
Attorney, Agent, or Firm—John A. Young, Esq.

[57] ABSTRACT

A fluid pressure control valve for maintaining the fluid pressure supplied to an associated fluid pressure operated device at or as near a selected value as the operating conditions of the associated fluid pressure operated device indicate to be appropriate. The valve comprises a housing incorporating a spindle axially displaceable in a spindle chamber against spring means by the selected pressure, the spring means being arranged to act between the spindle and a movable abutment. The arrangement of the spindle is such that at any given moment the level of fluid pressure supplied to the associated device by the valve is proportional to the spring force exerted on the spindle by the spring means at that moment, this spring force being normally proportional to the selected pressure thus ensuring that the selected pressure is supplied to the associated device. The spring force is also variable in response to movement of the movable abutment, resulting from a change in the operating conditions of the associated device necessitating a change in the pressure applied to the fluid pressure operated device, under the control of valve means, of which the following is a specification.

9 Claims, 7 Drawing Figures

FLUID PRESSURE CONTROL VALVE

This invention relates to fluid pressure level control valves and particularly to pressure level control valves for use in vehicle or aircraft anti-skid systems.

One object of the invention is to provide a pressure level control valve for a vehicle or aircraft anti-skid system which will maintain the level of pressure in an associated brake line during braking substantially at the level selected by the operator or as near that value as the road or runway surface will sustain without skidding.

According to one aspect of the present invention a fluid pressure control valve for maintaining the fluid pressure supplied to an associated fluid pressure operated device at or as near a selected value as the operating conditions of the fluid pressure operated device indicate to be appropriate comprises a housing incorporating a spindle axially displaceable in a spindle chamber against spring means by the selected pressure, the spring means being arranged to act between the spindle and a movable abutment, the spindle chamber being provided with inlet, outlet and exhaust ports, the axial position of the spindle within the chamber being arranged to alternatively allow communication between the inlet and outlet ports, thereby connecting the associated device to the selected pressure, or between the exhaust and outlet ports, thereby exhausting the pressure applied to the associated device, or to cut off communication between any of these ports, the arrangement of the spindle being such that at any given moment the level of fluid pressure supplied to the associated device by the valve is proportional to the spring force exerted on the spindle by the spring means at that moment, this spring force being normally porportional to the selected pressure thus ensuring that the selected pressure is supplied to the associated device, the spring force also being variable in response to movement of the movable abutment, resulting from a change in the operating conditions of the associated device necessitating a change in the pressure applied to the fluid pressure operated device, under the control of valve means.

The present invention also provides a vehicle or aircraft anti-skid system employing a fluid pressure level control valve as defined in the preceding paragraph.

One embodiment of the present invention as applied to a fluid pressure level control valve for use in an aircraft anti-skid system will now be described by way of example with reference to the accompanying drawings in which:-

Figure 1:
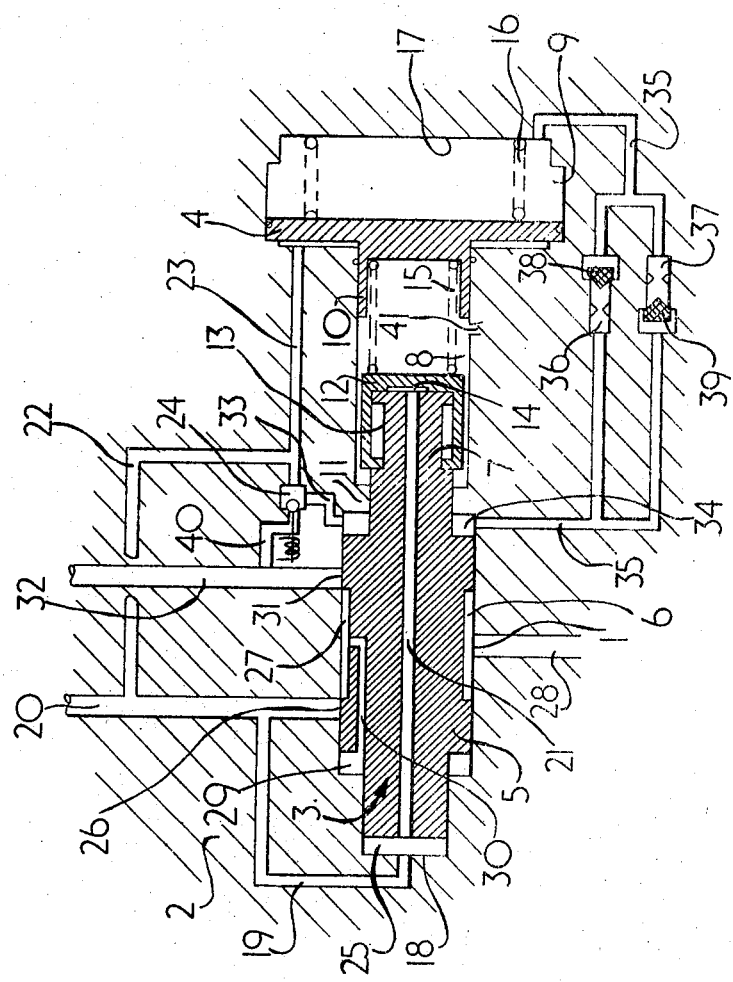
FIGS. 1 to 5 show diagrammatic representations of a fluid pressure level control valve in accordance with the present invention, suitable for use in an aircraft anti-skid system, in varous modes of operation.

A fluid pressure level control valve in accordance with the present invention, as shown in FIG. 1, comprises a housing 2 in which a valve spindle 3 and a movable abutment in the form of a control piston 4 are disposed.

The main portion 5 of the spindle 3 is in fluid-tight sliding contact in a cylindrical spindle chamber 6 of the housing, a head portion 7 of the spindle projecting through a sealing flange 11 into a smaller diameter cylindrical spring chamber 8 axially aligned with the chamber 6.

The control piston 4 is in fluid-tight sliding contact in a large diameter control chamber 9 axially aligned with the spring chamber.

One side of control piston 4 is provided with a cylindrical hollow boss 10 which projects into spring chamber 8 making fluid-tight contact with the walls of chamber 8, thereby separating chambers 8 and 9. A compression spring 16, disposed between the control piston and the wall 17 of control chamber 8 biases the control piston to a datum position at the left-hand end of the control chamber as shown in FIG. 1.

The head portion 7 of the spindle is provided with a displaceable enclosure member 12 in sealed sliding contact with the outside surface 13 of the spindle. The displaceable enclosure member defines in conjunction with the head portion of the spindle a variable volume chamber 14. A spring means in the form of a calibrated compression spring 15 is disposed between the displaceable enclosure member and the hollow boss 10 to bias the enclosure member and hence spindle 3 to the left as shown in FIG. 1. Any other suitable spring means, such as for example spring washers, may be used in place of the compression spring.

The end 18 of the spindle chamber 6 is connected via hydraulic lines 19 and 20 to a pilot operated foot pedal control valve (not shown) so that the portion 25 of the spindle chamber is always connected to the braking pressure selected by the pilot. The braking pressure selected by the pilot is also communicated to variable volume control chamber 14 through an axially extending drilling 21 in the spindle.

Hydraulic lines 22 and 23 respectively connect the braking pressure selected by the pilot to one side of a two-position solenoid operated pilot valve 24 and to the portion of the control chamber on the left of piston 4 as shown in FIG. 1. The pilot valve may be contained within the housing, as shown in FIG. 1, or may alternatively be a separate unit.

An inlet port 26 is arranged to communicate the brake pressure selected by the pilot to the brakes via annular groove 27, outlet port 1 and brake line 28 when the spindle 3 is in the appropriate position. The pressure in annular groove 27 and brake line 28 is also communicated to annular portion 29 of the spindle chamber 6 by an axial drilling 30.

An exhaust port 31 is arranged to exhaust the pressure in brake line 28 via annular groove 27 and exhaust line 32 when the spindle 3 is in the appropriate position. Exhaust line 32 is also connected to the other side of pilot valve 24 via line 40 and to spring chamber 8 via port 41.

Hydraulic line 33 connects annular portion 34 of the spindle chamber to the pilot valve.

The portion of the control chamber to the right of piston 4 is also connected, via hydraulic line 35 incorporating the parallel arrangement of restrictors 36 and 37 and non-return valves 38 and 39, to the annular portion 34 of the spindle chamber. Non-return valve 38 prevents the flow of fluid out of the control chamber 9 through restrictor 36 while non-return valve 39 prevents the flow of fluid into control chamber 9 through restrictor 37.

Whenever the associated brakes are not tending to skid the pilot valve is arranged to close the line 40, thereby cutting off connection between annular portion 34 of the spindle chamber and exhaust line 32. Also with the brakes in the "off" position as shown in FIG. 1, the variable volume chamber 14 is reduced to minimum volume thereby removing the loading from calibrated spring 15 and the inlet and exhaust valves 26 and 31 are closed.

The above pressure level control valve functions as follows.

The pilot applies the aircraft brakes thereby producing the selected braking pressure in line 20. This pressure is communicated to portion 25 of spindle chamber 6, to variable volume chamber 14, inlet port 26, pilot valve 24 and control chamber 9. If the pilot selects maximum braking pressure the displaceable enclosure member 12 will be deflected by the braking pressure to maximise the volume of variable volume chamber 14, thereby compressing calibrated spring 15 (see FIG. 2) until the spring force tending to move the displaceable enclosure member, and hence the spindle to the left is equal to the force to the right exerted by the braking pressure.

As the pilot valve 24 is closing line 40 the braking pressure in line 22 is communicated through line 33 to annular portion 34 of the spindle chamber and also through line 35 via restrictor 36 and non-return valve 38 to control chamber 9.

The areas on which the fluid in annular portions 25 and 34 of the spindle chamber is arranged to act are equal. When braking fluid enters annular portion 34 the previous balanced condition of the spindle is upset and the spindle is deflected to the left to open inlet port 26 and hence connect brake line 28 to the selected brake pressure. The level of pressure in brake line 28 and the communicating portions 27, 29 and 30 of the spindle chamber continues to rise until the force to the right exerted on the spindle corresponds to the force to the left exerted by the spring 15 whereupon the balance of the spindle is restored and inlet, outlet and exhaust ports are closed, the area of portion 29 on which the fluid pressure in this portion acts to tend to deflect the spindle to the right being equal to the area on which the fluid in portion 34 acts to tend to deflect the spindle to the left.

Figure 2:
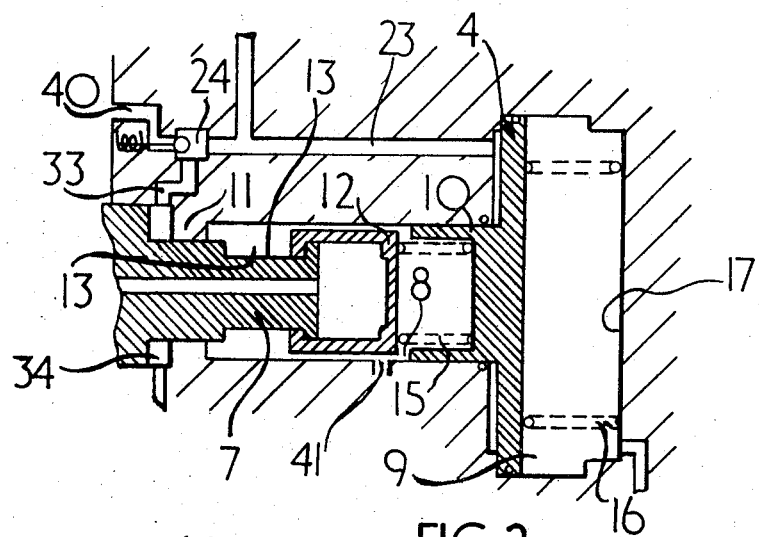

The construction of control piston 4 is such that the effective area subjected to the pressure on the right of the piston is twice that subjected to the pressure on the left of the piston so that the pressure generated to the right of the piston 4 together with the force exerted by spring 16 ensure that control piston 4 remains in its datum position at the extreme left hand end of its travel during braking when a skid does not occur (see FIG. 2).

If we now assume that the runway surface cannot sustain the maximum braking pressure applied by the pilot before a skid arises, the valve will operate as described above but when the wheels start to skid an associated electric skid detecting device (not shown) will energise the solenoid operated pilot valve to close off communication between line 22 and annular portion 34 of the spindle chamber simultaneously opening line 40 to exhaust annular portion 34 and hence control chamber 9 via restrictor 37 and non-return valve 39.

Thus the balance of spindle 3 is again upset and the pressure in brake line 28 which acts in the communicating portions 29, 27 and 30 deflects the spindle to the right opening exhaust port 31 and exhausting the pressure in brake line 28 via exhaust line 32.

Figure 3:
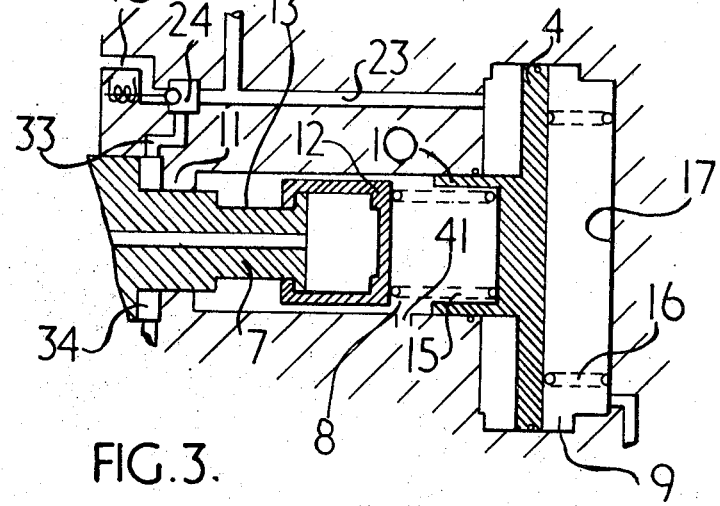

The previously referred to exhausting of control chamber 9 through restrictor 37 results in the displacement of the control piston to the right as shown in FIG. 3. This reduces the force to the left exerted by calibrated spring 15 on the spindle and the piston 4 continues to move to the right at a rate dependent on restrictor 37 as long as the skid detecting device is energising pilot valve 24.

When the skid ceases and the pilot valve is deenergised, thus re-connecting the brake line 28 to the selected braking pressure in line 20 in a similar manner to that described above, the level of pressure in brake line 28 rises very quickly to balance the spindle against the new and lower force to the left exerted by calibrated spring 15. Also the selected brake pressure in line 22 is connected via restrictor 36 in line 35 to control chamber 9 thus piston 4 is forced to the left at a rate dependent on the flow characteristics of restrictor 36. This gradual movement of piston 4 to the left increases the loading on calibrated spring 15 until the value corresponding to the brake pressure selected by the pilot is again reached. During the gradual increase in the spring force exerted by the calibrated spring 15 the level of pressure in brake line 28 is also gradually rising to maintain the balance of spindle 3.

Figure 4:
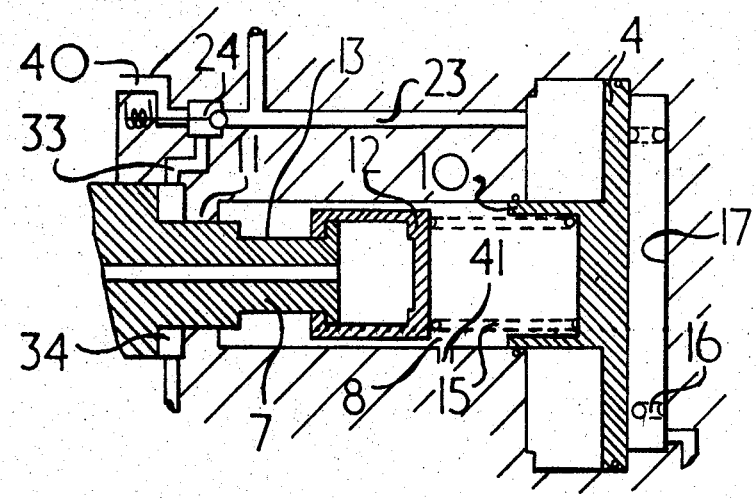

FIG. 4 of the accompanying drawings shows the valve after a prolonged skid or bounce of the aircraft clear of the ground during which the piston 4 has been displaced to the extreme right-hand end of its travel. In this position the force exerted on the spindle by the spring 15 is substantially zero thus when the brakes are subsequently re-applied, the level of pressure in brake line 28 will only start to rise gradually from zero as the piston 4 is forced to the left by the influx of brake pressure through restrictor 36.

Figure 5:
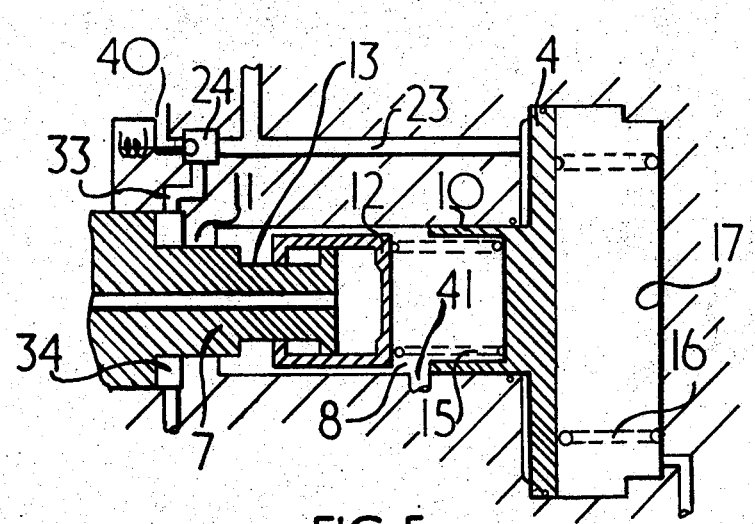

FIG. 5 shows the valve when the anti-skid system is inoperative and the pilot has selected half maximum braking pressure. In this condition the displaceable enclosure member 12 has been deflected by the selected braking pressure to cause variable volume chamber 14 to assume half its maximum volume and to compress calibrated spring 15 to generate a spring force half that exerted when maximum braking pressure is selected.

Although in the above description only one cycle of the valve has been described, it will be understood by those skilled in the art that during the correction of a skid this cycle may be repeated many times, the pressure in the brake line 28 being alternately exhausted and raised to a level sufficient to balance the spindle against the force exerted by spring 15 at the given moment.

Figure 6:
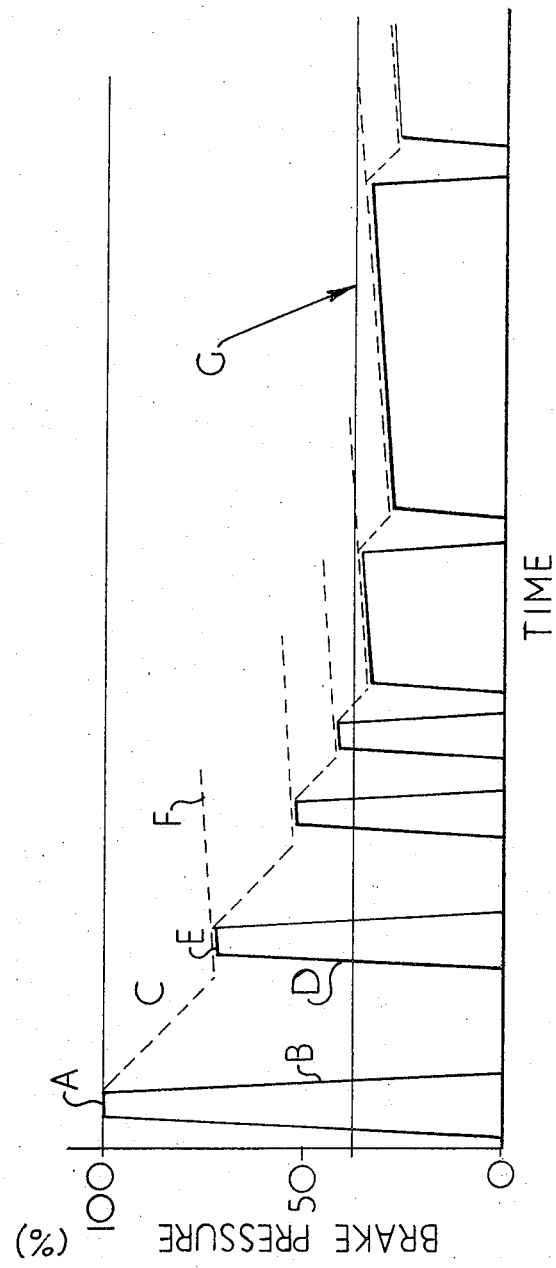
FIG. 6 shows a graphical representation of the variation of brake pressure with time when employing a fluid pressure level control valve in an aircraft anti-skid system.

The behaviour of the pressure level control valve and its associated anti-skid system is shown in FIG. 6 of the accompanying drawings which shows a graph of the variation of brake pressure with time during a brake application.

Initially the pilot applies the brakes, selecting 100% brake pressure, and the brake pressure rises to the selected value A. The pilot valve 24 is then energized and the pressure in the brake line exhausted (see curve B of the graph). During the exhausting of the brake line the force exerted on the spindle by the spring 15 is falling (see curve C) as the piston 4 is deflected to the right in control chamber 9. Thus when the pilot valve is deenergised and the brakes re-applied (see curve D) the pressure in brake line 28 will rise quickly to the level required to balance the new force of spring 15 (see point E) whereupon the spring force and hence the level of pressure in the brake line 28 will rise more gradually as the piston 4 is returned to the left (see curve F). Should the level E be still above the level G which the runway can sustain without skidding, the pilot valve 24 will again be energized and the above sequence repeated until the system stabilizes the pressure in the brake line 28 around the level G.

Should the coefficient of friction of the runway increase thereby raising the level G the pressure applied to the brake line 28 will gradually rise under the control of restrictor 36.

Figure 7:
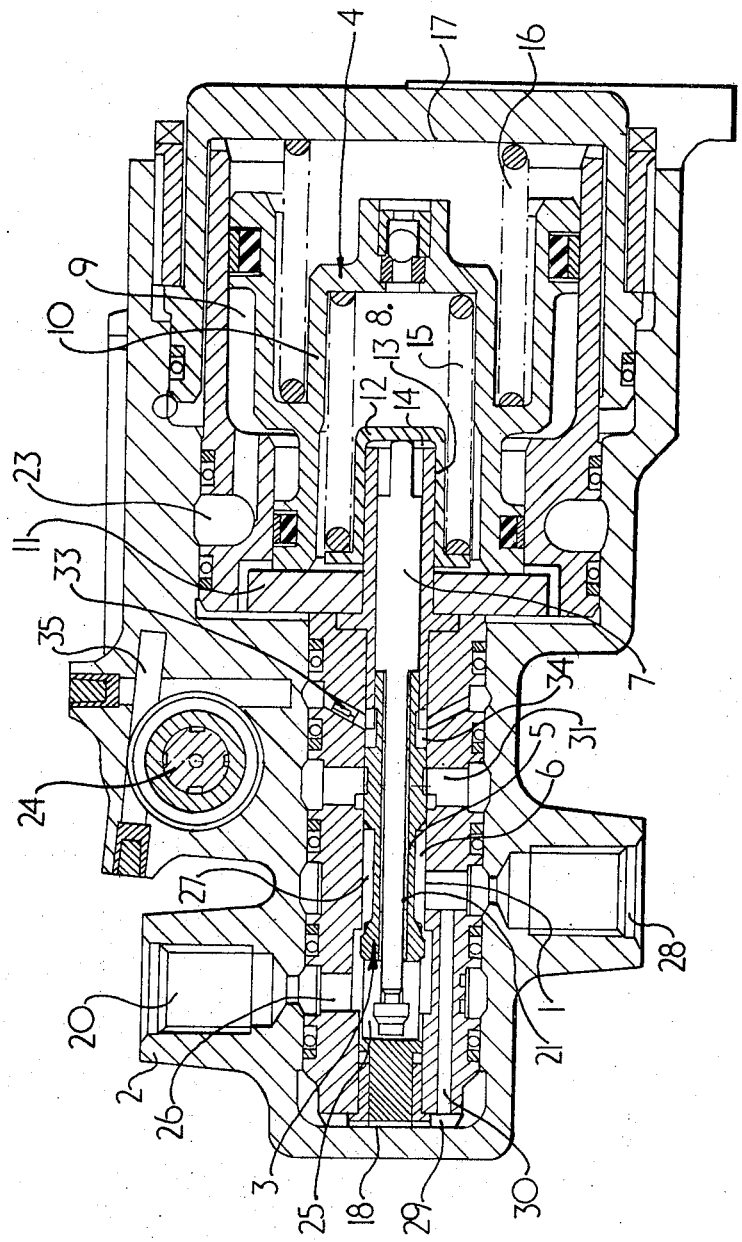
FIG. 7 shows a working version of the fluid pressure level control valve shown diagrammatically in FIGS. 1 to 5.

A working version of the pressure level control valve, shown diagrammatically in FIGS. 1 to 5, is shown in FIG. 7 wherein components of a similar function to those shown in FIGS. 1 to 5 are similarly numbered.

It will be understood by those skilled in the art that although the pressure level control valve in accordance with the present invention has been described above with reference to an aircraft anti-skid system, the valve is also suitable for use in many other fields for the control of the level of pressure supplied to fluid pressure operated devices. Further, although the pressure level control valve has been described above as part of a system in which an associated pilot valve is automatically operated by a detecting device arranged to monitor the operating conditions of the aircraft brakes, in other applications of the pressure level control valve the pilot valve can alternatively be manually operated if the operating characteristics, conditions and nature of the fluid pressure operated device under the control of the pressure level control valve permit this.

It should also be understood that the fluid pressure level control valve is equally applicable to the control of hydraulically or pneumatically operated devices.

Having now described our invention - what we claim is:

1. For use in antiskid control systems, a fluid pressure control valve for maintaining the fluid pressure supplied to an associated fluid pressure operated device at or as near a selected value as the operating conditions of the associated fluid pressure operated device indicate to be appropriate, said valve comprising a housing having an axially displaceable spindle, a spindle chamber for calibrated spring means acting against said spindle under the selected pressure, said spring means being arranged to act between the spindle and a movable abutment to provide a variable brake applying pressure, the spindle chamber being provided with inlet, outlet and exhaust ports, the axial position of the spindle within the chamber being arranged to alternatively allow communication between the inlet and outlet ports, thereby connecting the associated device to the selected pressure, or between the exhaust and outlet ports, thereby exhausting the pressure applied to the associated device, or to cut-off communication between any of these ports, the arrangement of the spindle being such that at any given moment the level of fluid pressure supplied to the associated device by the valve is proportional to the spring force exerted on the spindle by the spring means at that moment, said spring force being normally proportional to said selected pressure which is to insure that the selected pressure is supplied to the associated device, and also being variable in spring rate responsively to movement of the movable abutment effected by a change in the operating conditions of the associated device under the control of said valve means.

2. A valve according to claim 1 wherein the end of the spindle acted upon by the spring means is provided with a displaceable enclosure member in sealed sliding contact with the outside surface of the spindle, the enclosure member defining in conjunction with the associated end of the spindle a variable volume chamber, the spring means being arranged to act on the enclosure member, and hence the spindle, so as to tend to reduce the volume of the variable volume chamber the other end of the spindle being acted upon by the selected pressure, this pressure also being supplied to the variable volume chamber so that displacement of the enclosure member by the selected pressure against the spring means causes a corresponding reaction spring force from the spring means upon the enclosure member and hence the spindle.

3. A valve according to claim 1 wherein the spring means comprises a compression spring.

4. A valve according to claim 1 wherein the movable abutment comprises a displaceable control piston in sealed axial sliding contact within a fluid pressure containing control chamber, the control piston being spring-biased towards a datum position in the control chamber and the valve means being arranged to control the axial position of the control piston within the control chamber by adjusting the relative values of the pressures acting on either side of the control piston in the control chamber in order to deflect the control piston to the position giving the spring force appropriate to the operating conditions of the associated fluid pressure operated device at any moment.

5. A valve according to claim 7 wherein the control piston is biased towards the end of the control chamber adjacent the spring means by a compression spring.

6. A valve according to claim 4 wherein the side of the control piston arranged to be subjected alternatively to the selected pressure and to exhaust is provided with a greater effective area than the other side of the control piston.

7. A valve according to claim 4 wherein the valve means comprises a solenoid operated pilot valve incorporated within the housing.

8. A valve according to claim 4 wherein one side of the control piston is subjected to the selected pressure and the other side of the control piston is arranged to be alternatively connected, under the control of the valve means, to the selected pressure or to exhaust.

9. A valve according to claim 8 wherein the fluid pressure supply line to the side of the control piston which is arranged to be alternatively connected to the selected pressure or to exhaust is provided with two restrictor and non-return valve arrangements in parallel, one restrictor and non-return valve arrangement being arranged to control the rate of flow of fluid to this side of the control piston and the other restrictor and non-return valve arrangement being arranged to control the rate of exhausting of fluid from this side of the control piston.

* * * * *

UNITED STATES PATENT OFFICE
CERTIFICATE OF CORRECTION

Patent No. 3,792,908                    Dated February 19, 1974

Inventor(s) Alan Ronald Brewster, Sanuel Eric Harvey, Frank Radcliffe Mortimer

It is certified that error appears in the above-identified patent and that said Letters Patent are hereby corrected as shown below:

claim 5, line 1, delete "7" and insert -- 4 --.

Signed and sealed this 10th day of September 1974.

(SEAL)
Attest:

McCOY M. GIBSON, JR.                    C. MARSHALL DANN
Attesting Officer                       Commissioner of Patents